United States Patent [19]

Stilin

[11] Patent Number: 4,501,169
[45] Date of Patent: Feb. 26, 1985

[54] TWO SPEED GEAR DRIVE WITH REVERSIBLE INPUT AND UNIDIRECTIONAL OUTPUT

[75] Inventor: John J. Stilin, Milwaukee, Wis.

[73] Assignee: The Falk Corporation, Milwaukee, Wis.

[21] Appl. No.: 458,488

[22] Filed: Jan. 17, 1983

[51] Int. Cl.³ .......................... F16H 5/52; F16D 41/04
[52] U.S. Cl. .......................... 74/812; 74/810; 192/48.92
[58] Field of Search ............... 74/810, 812, 143, 7 E, 74/7 C; 192/48.92

[56] References Cited

U.S. PATENT DOCUMENTS

| | | | |
|---|---|---|---|
| 1,140,132 | 5/1915 | Dorsey | 74/810 |
| 2,473,250 | 6/1949 | Hoffman | 74/810 |
| 2,694,939 | 11/1954 | Schmitter | 74/812 |
| 2,836,085 | 5/1958 | Snyder | 74/812 |
| 2,903,901 | 9/1959 | MacDonald | 74/810 X |
| 3,361,010 | 1/1968 | Miller | 74/810 |
| 3,832,914 | 9/1974 | Pinfield | 74/812 |

FOREIGN PATENT DOCUMENTS 7901748  9/1980  Netherlands ................... 74/812

*Primary Examiner*—Allan D. Herrmann
*Assistant Examiner*—Arthur T. Quiray
*Attorney, Agent, or Firm*—Quarles & Brady

[57] ABSTRACT

A gear drive has an input shaft driven by a variable speed, reversible hydraulic motor. The input shaft mounts one of two one-way clutches. The second one-way clutch is mounted on a quill output shaft disposed about the input shaft and connected to the input shaft by reduction gearing. The two one-way clutches are joined together and to a stub shaft. Rotation of the motor in one direction will cause one of the clutches to engage to drive the stub shaft in one speed range while rotation of the motor in the opposite direction will cause the other clutch to engage to drive the stub shaft in a second speed range.

4 Claims, 3 Drawing Figures

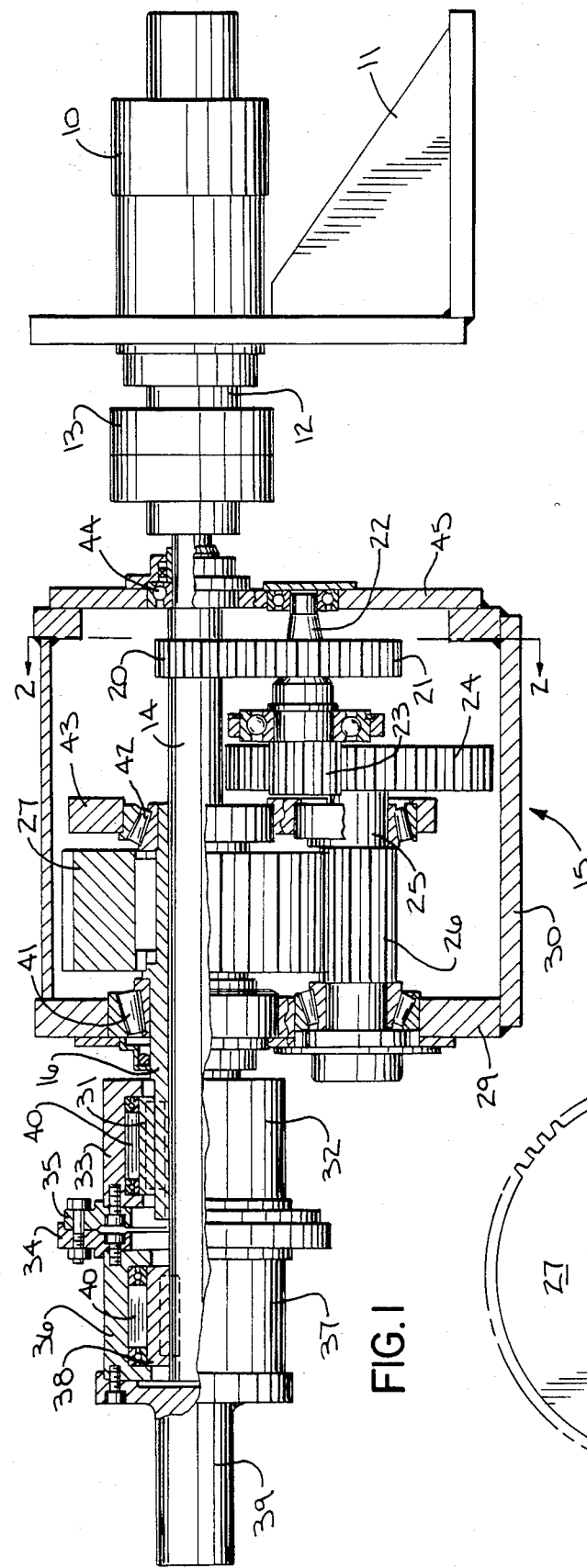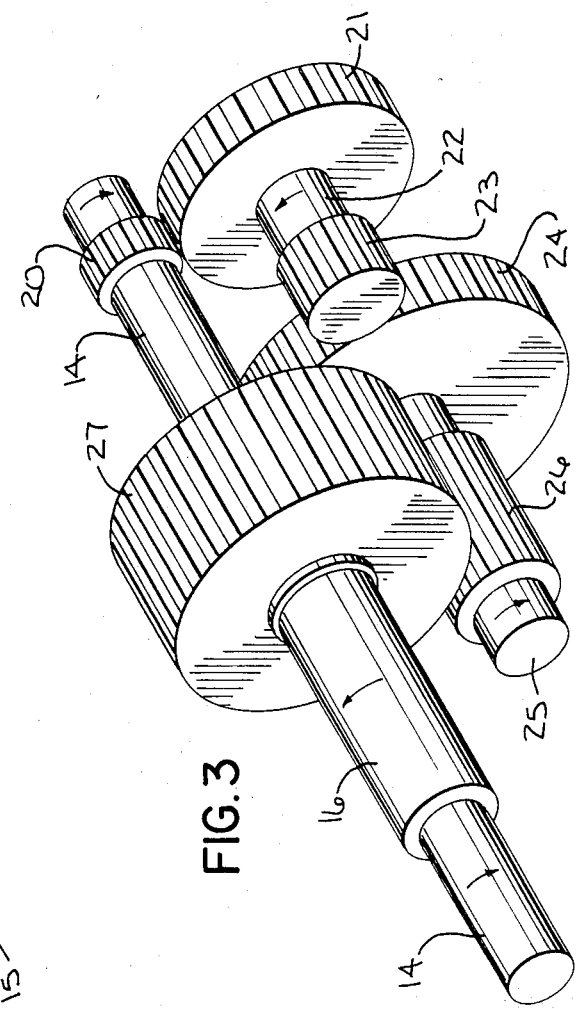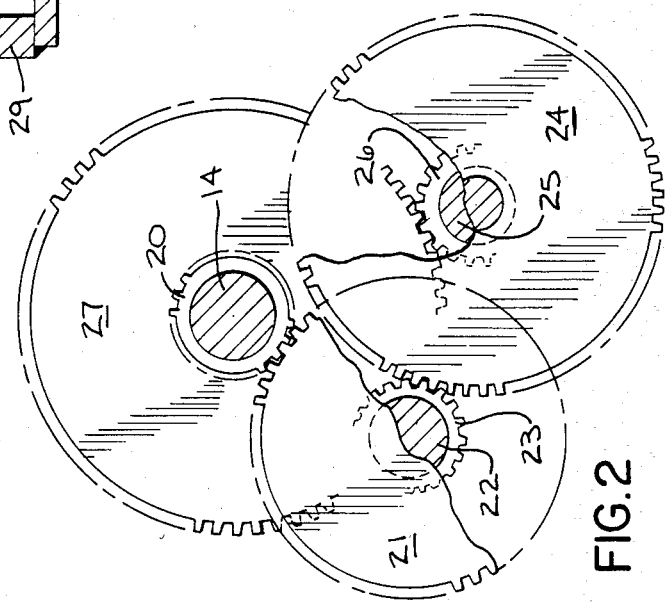

TWO SPEED GEAR DRIVE WITH REVERSIBLE INPUT AND UNIDIRECTIONAL OUTPUT

BACKGROUND OF THE INVENTION

This invention relates to gear drive apparatus, and particularly to a drive in which the speed of the output can be controlled by controlling the direction of rotation of the input.

There are applications for gear drives in which it is desired to have two output speeds and in which is cumbersome or impractical to use a shifting gear transmission to provide the different speeds. A typical application is a drive for a belt conveyor. It is most desirable to provide slow speeds for start up and for inspection and high speeds for normal operation. This has been accomplished by using a squirrel cage motor operating through a speed reducer gear drive with the motor providing the soft start up of the belt conveyor.

I have developed a gear drive unit which will provide different output speeds solely by controlling the direction of rotation of the input. The invention not only permits control of two speeds, but also allows for control within two speed ranges depending upon the direction and speed of the input.

SUMMARY OF THE INVENTION

In accordance with the invention I provide a gear drive apparatus which includes a pair of coaxial one-way clutches joined together; a high speed shaft connected to one of the clutches and connectable to a prime mover; a quill shaft surrounding the high speed shaft and connected to the other clutch; and reversing speed change gearing connecting the high speed shaft and the quill shaft.

Further in accordance with the invention I provide such an apparatus which is driven by a prime mover whose output can be controlled both as to direction and speed.

In a gear drive apparatus in accordance with my invention, when the prime mover output is in one direction the clutch connected to the high speed shaft will be engaged while the clutch connected to the quill shaft will overrun because the quill shaft will be rotating in an opposite direction. When the direction of rotation of the prime mover is reversed, the clutch connected to the high speed shaft will be overrunning and the clutch assembly will be driven through the quill shaft and at a different speed depending upon the ratios of the reversing gearing.

It is a principal object of the invention to provide a gear drive unit in which the output speed is controlled by the direction of the input to the unit.

It is a further object of the invention to provide a gear drive unit for a belt conveyor which permits soft start up, inching drive, and slow speeds for loading, unloading and inspection as well as normal high speed operation.

The foregoing and other objects and advantages of the invention will appear in the following detailed description. In the description reference is made to the accompanying drawings which illustrate a preferred embodiment of the invention.

BRIEF DESCRIPTION OF THE DRAWINGS

FIG. 1 is a view in elevation and partially in section of a gear drive apparatus in accordance with the present invention;

FIG. 2 is an end view of the triple reduction gearing of the gear drive unit viewed from the plane of the line 2—2 of FIG. 1; and FIG. 3 is an isometric view illustrating the arrangement of shafts and gearing in the gear drive apparatus of FIG. 1.

DETAILED DESCRIPTION OF THE PREFERRED EMBODIMENT

Referring to the drawings, a hydraulic motor 10 mounted on a pedestal 11 has its output shaft 12 connected by a coupling 13 to a high speed through shaft 14 of a triple reduction gear drive 15. The triple reduction gear drive 15 has an output shaft 16 in the form of a quill shaft which is coaxial with and surrounds the high speed shaft 14 which extends entirely through the gear reducer 16.

The quill output shaft 16 is connected to the high speed input shaft 14 by triple reduction meshing gearing which consists of: a pinion 20 keyed to the high speed shaft 14 and meshing with a gear 21 keyed to a first intermediate shaft 22; a pinion 23 on the first intermediate shaft 22 and meshing with a gear 24 keyed to a second intermediate shaft 25; and a pinion 26 formed on the second intermediate shaft 25 that meshes with a driven gear 27 keyed to the quill output shaft 16. Since the gears are in constant mesh, the output quill shaft 16 will always be driven when the high speed shaft 14 is driven but it will be driven in the opposite direction and at a much lower speed because of the triple reduction accomplished by the gearing (see FIG. 3).

The quill output shaft 16 projects beyond the output end wall 29 of the housing 30 of the gear unit 15. The projecting portion of the quill output shaft 16 has keyed to it the inner race 31 of a first one-way clutch 32. The outer race 33 of the first one-way clutch 32 is connected through a pair of flange plates 34 and 35 to the outer race 36 of a second one-way clutch 37. The inner race 38 of the second one-way clutch 37 is keyed to the projecting end of the high speed shaft 14. The outer race 36 of the second one-way clutch 37 is bolted to the flange of a stub shaft 39 which is adapted to be coupled to the equipment which is to be driven by the apparatus.

The one-way clutches 32 and 37 are of well known construction and operation. Such clutches may be obtained from the Formsprag Division of Dana Corporation. The one-way clutches 32 and 37 employ sprags 40 which operate between the inner and outer races of the clutches. The sprags 40 will engage when the inner and outer races are rotated relative to each other in one direction but which will disengage, or overrun, when the inner and outer races are rotated relative to each other in the opposite direction. For purposes solely of illustrating the operation of the apparatus of the present invention, it will be assumed that the one-way clutches 32 and 37 will engage when their inner races are rotated relative to their outer races in a clockwise direction as viewed from the stub shaft end of the apparatus.

The motor 10 may take several forms including that of an axial piston pump which is adjustable both as to direction by reversing the direction of flow through parts and is adjustable as to speed by adjusting the position of a swash block against which the pistons ride.

Thus, the motor 10 is capable of having its direction of rotation reversed and is also capable of having its output speed varied in each direction of rotation.

In operation, if the motor 10 rotates the high speed shaft 14 in a clockwise direction as viewed in FIG. 2, the second one-way clutch 37 will engage since its inner race will be rotated by the high speed shaft 14 in a clockwise direction. At the same time, the quill shaft 16 will be rotated in a counterclockwise direction as shown by the arrows in FIG. 2, and the first overrunning clutch 32 will be in an overrunning, disengaged condition. The assembly of the outer races of the two clutches 32 and 37 will drive the stub shaft 39 in a clockwise direction at the speed at which the high speed shaft 14 is being driven by the motor 10.

If the direction of rotation of the high speed shaft 14 is now reversed so that it is rotated in a counterclockwise direction, the second overrunning clutch 37 will be disengaged and overrunning. However, the output quill shaft 16 will now be rotated in a clockwise direction. As a result, the first clutch 32 will be engaged and the assembly of the clutches 32 and 37 will drive the stub shaft 39. The stub shaft 39 will be rotated in the same clockwise direction. However, it will be driven at a speed which is greatly reduced from the speed of the high speed shaft 14 since it is driven through the triple reduction gearing. Note that the stub shaft 39 is always rotated in the same direction regardless of the direction of input.

Since the hydraulic motor 10 speed can be controlled as well as its direction, the speed of the stub shaft 29 within either the high speed range or the lower speed range can also be controlled.

The quill shaft 16 is journaled in tapered roller bearings 41 and 42 mounted in the output end wall 29 and an intermediate wall 43 of the housing 30. The high speed shaft 14 is journaled in a bearing 44 mounted in an input end wall 45 of the housing 30. The other end of the high speed shaft 14 is supported by the assembly of the clutches 32 and 37 which is in turn supported on the quill shaft 16.

While the preferred embodiment employs a triple reduction gear unit, any reversing gearing can be employed including speed increase gearing.

When the gear drive apparatus in accordance with the invention is connected to drive a conveyor, the slow speed range can be used for soft starts, inching for inspection, and loading and unloading while the high speed range can be used for normal operation.

I claim:

1. A gear drive apparatus, comprising:
   a pair of coaxial one-way clutches each having an inner race and an outer race, the outer races of the clutches being joined together and the joined outer races being joined to a stub shaft;
   a high speed shaft connected to the inner race of one of said clutches;
   a reversible prime mover coupled to said high speed shaft;
   a quill shaft surrounding said high speed shaft and connected to the inner race of the other of said clutches; and
   reversing reduction gearing joining the high speed shaft and the quill shaft.

2. A gear drive apparatus in accordance with claim 1 wherein said reduction gearing provides triple speed reduction and wherein said prime mover is adjustable to vary the output speed of said prime mover in both directions of rotation.

3. A gear drive apparatus, comprising:
   a reversing speed reducer including a high speed shaft having an input end adapted to be coupled to a reversible prime mover and an output end, an output quill shaft surrounding the output end of the high speed shaft, and meshing gearing joining the high speed shaft and quill shaft;
   a pair of one-way clutches coaxial with each other and joined together, one of said clutches being connected to each of said high speed and quill shafts, said clutches each comprising an outer race joined to the outer race of the other clutch, an inner race keyed to the respective shaft, and sprags adapted to connect the inner and outer races in only one direction of relative rotation between the races; and
   a stub shaft connected to the clutches.

4. A gear drive apparatus in accordance with claim 3 wherein said speed reducer includes a housing having input and output end walls and intermediate walls, and wherein said quill shaft is journaled in bearings in the output end wall and an intermediate wall and said high speed shaft is journaled in a bearing in the input end wall and is supported at its other end by the clutches which are in turn supported by the quill shaft.

* * * * *